United States Patent [19]

Baumgarten

[11] Patent Number: 5,555,604
[45] Date of Patent: Sep. 17, 1996

[54] HANDLE FASTENING ON A UTENSIL, FOR EXAMPLE A COOKING UTENSIL

[75] Inventor: Gerd-Diethard Baumgarten, Wilnsdorf-Wilden, Germany

[73] Assignee: Heinrich Baumgarten KG Spezialfabrik fuer Beschlagteile, Neunkirchen, Germany

[21] Appl. No.: 271,825

[22] Filed: Jul. 7, 1994

[30] Foreign Application Priority Data

Jul. 10, 1993 [DE] Germany .................. 43 23 106.3

[51] Int. Cl.⁶ ................................................ A47J 45/10
[52] U.S. Cl. ................... 16/114 A; 16/110 A; 220/770
[58] Field of Search .................... 16/114 A, 114 R, 16/110 A, DIG. 19, DIG. 24, DIG. 25; 220/770; 164/98, 111

[56] References Cited

U.S. PATENT DOCUMENTS 2,337,120 12/1943 McMullen ................. 220/770
2,497,384 2/1950 Young ........................ 16/114 A
4,083,081 4/1978 Witte ........................... 16/114 A

*Primary Examiner*—Chuck Y. Mah
*Attorney, Agent, or Firm*—Flynn, Thiel, Boutell & Tanis, P.C.

[57] ABSTRACT

It is difficult in utensils manufactured by die casting or injection molding, for example cooking utensils of an aluminum alloy, to directly fasten a support arm on which in turn a handle piece can be fastened. Therefore, holding bars are needed in most cases, to which the support arm is welded or screwed. The holding bars must be inserted during casting and are during casting always in danger of being washed away. Other solutions, which do away with such holding bars, require an additional operation in order to fasten the support arm on a suitably designed attachment on the utensil. The invention avoids additional structural parts and ties a support arm during the casting operation with a specially designed holding piece into a boss.

17 Claims, 1 Drawing Sheet

HANDLE FASTENING ON A UTENSIL, FOR EXAMPLE A COOKING UTENSIL

FIELD OF THE INVENTION

The invention relates to a handle fastening on a die cast or injection molded utensil, for example a cooking utensil or the like, comprising a support arm which can be fastened to the outer periphery of the utensil, and over which a handle piece can be moved in direction of the utensil and locked to the support arm.

BACKGROUND OF THE INVENTION

Such a handle fastening is known from DE-Patent 22 64 244. When using such an arrangement on cooking utensils or the like, which are cast, for example, out of an aluminum alloy, problems arise with the fastening of the support arm to the utensil. A special holding bar is in most cases integrally formed on the periphery of the utensil. The support arm is later either welded or screwed to the holding bar. It is understood that an exact orientation of the holding bar in relationship to the utensil is difficult during the casting process. Also there is the danger that the holding bar is washed away when the casting material runs in because its fastening in the mold is also difficult to handle. Faulty castings are the unavoidable consequence.

When the support arm is welded to an integrally cast holding bar, deformations of the workpiece can be the result so that required dimensions are no longer maintained. This is particularly bad in mass production, where consecutively oriented operating devices are set for specific dimensions of the workpieces. Thus this operation also harbors the danger that the thereby manufactured semifinished articles cannot be further processed in one production line.

To fasten the support arm by means of a screw connection, regardless whether directly to the utensil or on an integrally cast holding bar, requires much work and furthermore does not guarantee a fixed connection, in particular over a long period of time.

The purpose of the invention is to provide a handle fastening of the above in detail described type in such a manner that neither a holding bar to be cast separately on the utensil is provided, on which bar the support arm would have to be fastened, nor that a special operating step is needed for such a fastening.

The purpose is attained according to the invention in such a manner that a holding piece, which is integral with the support arm, is constructed on the support arm, which holding piece is cast into a boss integrally provided on the utensil.

The invention thus avoids both a holding bar and also the complicated mounting of the support arm on the utensil. However, the holding piece can thereby also not be flushed away during the casting process in contrast to the conventional holding bar because it is a part of the support arm, the remaining area of which stays outside of the mold and can in this manner be easily locked.

It is thereby advantageous when the holding piece is formed of at least one arm part of the support arm which arm part is essentially vertical in the position of use of the utensil; same can thus be contiguous with the sheet-metal arm plates of the support arm, in one piece with these plates, which plates are usually vertically aligned because of the position of use of the utensil. The arm part is designed in a simple manner as a sheet-metal part. In order to prevent in such a design that during the use of the utensil an arm part is torn out of the boss, it is preferably provided that at least one of the flat surfaces of the arm part, which surfaces are approximately parallel to an axis of the handle piece, has at least one recess. The recess is thereby advantageously designed as an opening in the arm part. The holding piece is in this manner form-lockingly securely anchored in the boss because the recess or rather the opening is filled with casting material.

The boss is in a particularly advantageous development of the invention interfaces in direction of the handle piece with a sealing plate which is fastened to the holding piece prior to it being integrally cast. The sealing plate is in this manner a part of the mold and prevents the casting material from penetrating into the remaining area of the support arm which is to be covered at least partially by the handle piece. The sealing plate separates thereby the boss from an area of the support arm which is not covered by the handle piece.

It can in particular also be advantageous when the sealing plate has at least one opening into which the holding piece can be guided, and when moreover the holding piece is designed such that it completely occupies the opening when it is guided into it. The essential congruence of the cross sections of the opening and of the holding piece assures that the casting material essentially stops at the sealing plate and does not penetrate there through to the otherwise needed areas of the support arm.

The holding piece is oriented in relationship to the boss, for example, such that a stop is provided which defines its introduction into the opening and abuts the sealing plate, and/or the holding piece abutting the sealing plate can be locked in this position in a simple manner such that the holding piece on a side of the sealing plate facing the boss, has at least one embossment or the like so that same resting on the sealing plate projects beyond the outer contour of the opening. Thus, a very rigid connection of the holding piece and thus of the support arm to the boss and thus the utensil results, which connection can be highly stressed without thereby having to fear its destruction.

An aesthetically particularly satisfactory design of the handle fastening of the invention results when the sealing plate has an arched designed-arched as a segment of a circular hollow cylinder such that an arch radius, referred to the axis of symmetry of the utensil, is provided and furthermore, if necessary, the edging of the sealing plate is embedded in casting material. Thus an encasing of the boss is not needed.

The arrangement can in a simple manner be such that the handle piece can be locked on the support arm by means of a spring piece, and/or that a sleeve is provided to encase an area of the handle fastening, which area cannot be covered by the handle piece and is connected to the boss. The operations for the assembly of the handle fastening are thus possibly reduced to the mounting of the spring and of the handle piece and the mounting of the sleeve. Such a simple assembly cannot be achieved with the up to now known arrangements.

BRIEF DESCRIPTION OF THE DRAWINGS

The invention will be discussed in greater detail hereinafter in connection with one exemplary embodiment and the drawings, in which.

DETAILED DESCRIPTION

Figure 1:
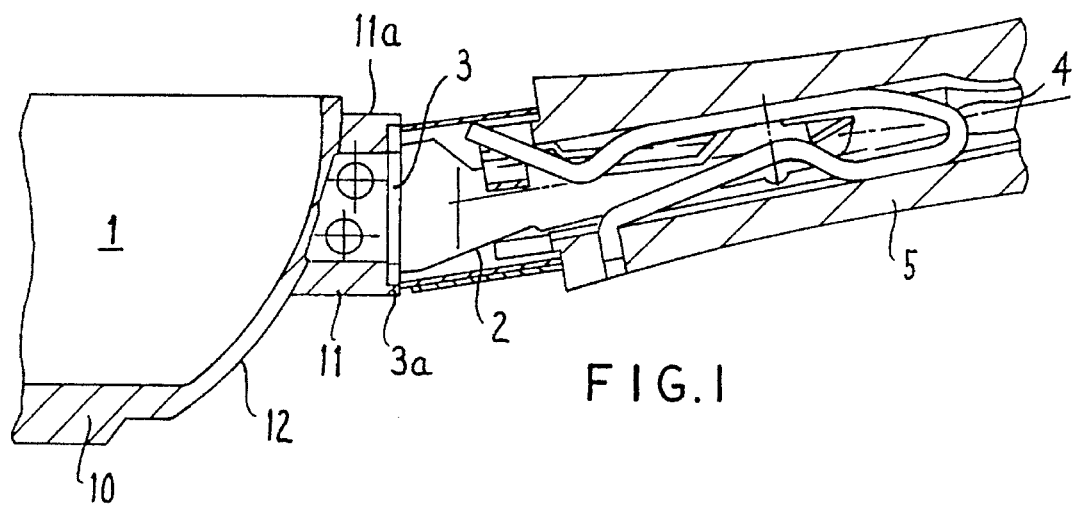
FIG. 1 is a central longitudinal cross-sectional view of a handle fastening embodying the invention.

A handle fastening of the invention on a utensil 1 consists according to FIG. 1 essentially of a boss 11 on the utensil 1, a support arm 2, a sealing plate 3, a spring piece 4 and a handle piece 5.

The boss 11 is provided on an outer contour 12 of the utensil i and consists of a casted mass 10 and forms one piece with the utensil also consisting of the casted mass 10.

Figure 2:
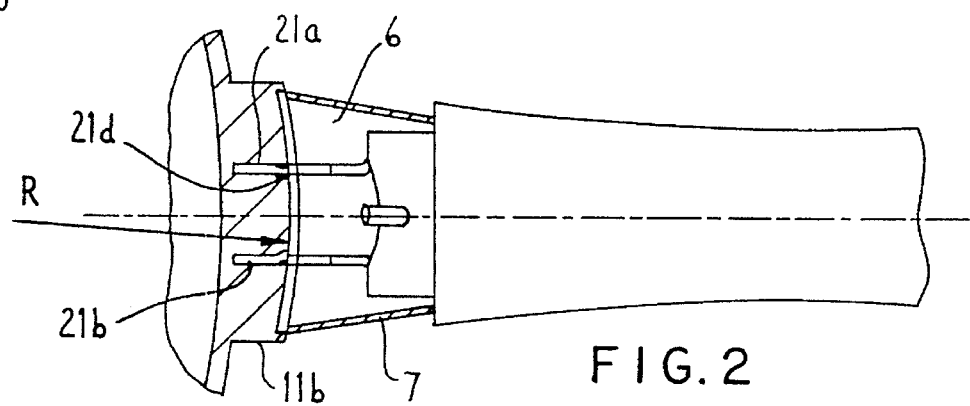
FIG. 2 is a partially cross-sectional top view of FIG. 1, and FIGS. 3 to 5 are, respectively, a front view, a side view and a top view of a support arm of the invention, all in a schematic illustration.
Figure 3:
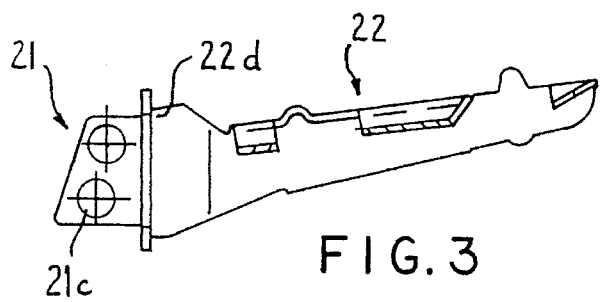

A holding piece 21 of the support arm 2 is cast into the boss 11 (FIG. 3). The holding piece 21 consists (FIG. 2) of two arm parts 21a and 21b which are constructed as sheet-metal plates and are positioned approximately vertically aligned in the position of use of the utensil 1, with the flat contour of the utensil being adapted approximately to the cross section of the boss 11 without reaching its edge surfaces 11a and 11b.

The arm parts 21a and 21b are one-piece parts of sheet-metal arm plates 22a and 22b of the support arm 2, which together with a connecting bight 22c form its body 22. The body 22 has several stops, openings and guides, with the help of which the here wire-like spring piece 4 can be fastened such that the handle piece 5 can be moved onto the support arm and releasably locked thereto at least partially covering the support arm 2; the details of this are in no direct relationship to the invention and are known to the man skilled in the art so that a discussion thereof is not needed. However, the drawings show that an area 6 of the handle fastening is not covered by the handle piece 5, but is instead covered by a sleeve 7 so that the parts of the support arm 2 and of the spring piece 4, which parts would otherwise be visible there, are also covered during the use of the utensil 1.

The sealing plate 3 closes off the boss 11 in direction of the area 6. It has an arched design with an arch radius R about the axis of symmetry (in most cases the central axis of rotation) of the utensil 1, which axis of symmetry lies outside of the drawing site. FIGS. 1 and 2 show that the edges 3a of the sealing plate 3 are embedded in one edge of the casting material 10 so that a stable orientation of the sealing plate 3 and an aesthetically pleasing design is created.

Figure 4:
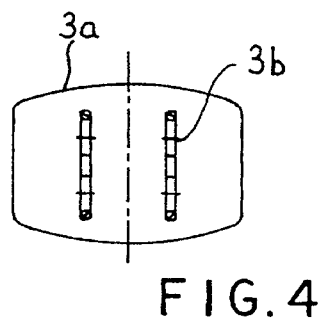
Figure 5:
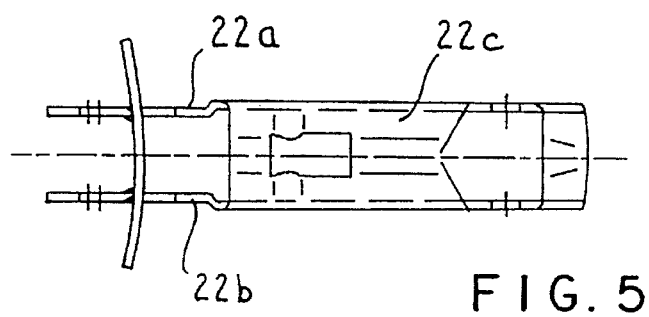

Two openings 3b, as they can best be recognized in FIG. 4, exist in the sealing plate 3; they are adapted to the cross section of the arm parts 21a and 21b extending through the openings so that there remains no space through which during casting of the holding piece 21 casting material 10 can penetrate into the area 6.

To anchor the arm parts 21a and 21b, openings 21c exist in the arm parts, which openings are filled with casting material 10 during casting.

Stops 22d are shown in particular in FIG. 3 and which are constructed on the sheet-metal arm plates 22a and 22b for assuring that they cannot be moved randomly far into the openings 3a. On the other hand, several embossments 21d can be produced on the arm parts 21a and 21b after the holding piece 21 is placed into the sealing plate 3 so that the sealing plate 3 will be locked and cannot again be removed from the holding piece 21, in particular prior to it being cast into the boss 11 (FIG. 2).

The embodiments of the invention in which an exclusive property or privilege is claimed are defined as follows:

1. In a handle fastening assembly mounting a handle piece on a utensil comprising a longitudinally extending support arm fastenable to the outer periphery of the utensil, and a handle piece having a hollow interior in which said support arm is slidably received so that said handle piece is movable along said support arm, the improvement comprising a shoulder piece disposed on said outer periphery of said utensil, said shoulder piece and said utensil being a single integral piece of a casting material, said support arm being a single integral piece and having at least one arm part which defines a holding piece of said support arm, said holding piece being received within said shoulder piece, said shoulder piece is cast and said holding piece is secured by said casting material therein, said at least one arm part defining vertically oriented surfaces on opposite sides thereof.

2. The handle fastening assembly according to claim 1, wherein said arm part is a sheet-metal part.

3. The handle fastening assembly according to claim 2, wherein said at least one arm part has at least one recess.

4. The handle fastening assembly according to claim 3, wherein said recess is an opening in said arm part.

5. The handle fastening assembly according to claim 1, wherein said handle piece includes locking means for locking said handle piece on said support arm, said locking means being a spring piece resiliently engaged with said support arm.

6. The handle fastening assembly according to claim 1, wherein said support arm includes a covered area covered by said handle piece and an open area disposed between said handle piece and said shoulder piece, a sleeve being provided that encases said open area of said support arm.

7. In a handle fastening assembly mounting a handle piece on a utensil comprising a support arm fastenable to the outer periphery of the utensil, and a handle piece having a hollow interior in which said support arm is slidably received so that said handle piece is movable along said support arm, the improvement comprising a shoulder piece disposed on said outer periphery of said utensil, said shoulder piece and said utensil being a single integral piece of a casting material, said support arm being a single integral piece and having at least one arm part which defines a holding piece of said support arm, said holding piece being received within said shoulder piece, said shoulder piece is cast and said holding piece is secured by said casting material therein, said holding piece further including a sealing plate fastened thereon which interfaces with said shoulder piece so as to define a shape for an interfacing shoulder surface of said shoulder piece.

8. The handle fastening assembly according to claim 7, wherein said sealing plate separates said shoulder piece from an open area of said support arm, said open area being adjacent a covered portion of said support arm which is covered by said handle piece.

9. The handle fastening assembly according to claim 7, wherein said sealing plate has at least one opening into which said holding piece is received.

10. The handle fastening assembly according to claim 9, wherein said holding piece completely occupies said opening of said sealing plate when said holding piece is disposed within said opening.

11. The handle fastening assembly according to claim 9, wherein a stop is provided on said holding piece, which said stop limits an insertion of said holding piece into said opening of said sealing plate and abuts against said sealing plate to define a fixed position for said sealing plate.

12. The handle fastening assembly according to claim 11, wherein said holding piece abutting against said sealing plate is locked in said fixed position.

13. The handle fastening assembly according to claim 12, wherein said holding piece has at least one embossment which is disposed on the side of said sealing plate facing said shoulder piece when said sealing plate is in said fixed position, said at least one embossment projecting beyond an outer contour of said opening and contacting said sealing plate.

14. The handle fastening assembly according to claim 7, wherein said sealing plate has an arched shape having an arch radius defined by an axis of symmetry of said utensil.

15. The handle fastening assembly according to claim 7, wherein a peripheral edge of said sealing plate is embedded in said casting material.

16. The handle fastening assembly according to claim 7, wherein said handle piece includes locking means for locking said handle piece on said support arm, said locking means being a spring piece resiliently engaged with said support arm.

17. The handle fastening assembly according to claim 7, wherein said support arm includes a covered area covered by said handle piece and an open area disposed between said handle piece and said sealing plate, a sleeve being provided that encases said open area of said support arm.

\* \* \* \* \*